US012596389B2

(12) United States Patent
Yarragunta et al.

(10) Patent No.: US 12,596,389 B2
(45) Date of Patent: Apr. 7, 2026

(54) THERMAL IMPROVEMENTS FOR MEMORY SUB-SYSTEMS

(71) Applicant: Micron Technology, Inc., Boise, ID (US)

(72) Inventors: Suresh Reddy Yarragunta, Bangalore (IN); Deepu Narasimiah Subhash, Yeshwanthpu (IN); Ramesh Nallavelli, Sangareddy (IN)

(73) Assignee: Micron Technology, Inc., Boise, ID (US)

( * ) Notice: Subject to any disclaimer, the term of this patent is extended or adjusted under 35 U.S.C. 154(b) by 349 days.

(21) Appl. No.: 18/235,169

(22) Filed: Aug. 17, 2023

(65) Prior Publication Data

US 2024/0069581 A1     Feb. 29, 2024

(30) Foreign Application Priority Data

Aug. 31, 2022    (IN) .............................. 202241049778

(51) Int. Cl.
| | |
|---|---|
| *G05D 23/19* | (2006.01) |
| *G06F 1/20* | (2006.01) |
| *G06F 12/02* | (2006.01) |

(52) U.S. Cl.
CPC .............. *G05D 23/19* (2013.01); *G06F 1/20* (2013.01); *G06F 12/0246* (2013.01); *G06F 2212/7201* (2013.01)

(58) Field of Classification Search
CPC . G05D 23/19; G06F 1/20; H05K 7/20; H05K 7/20736; F28D 20/02; F28D 20/022; F28D 20/023
See application file for complete search history.

(56) References Cited

U.S. PATENT DOCUMENTS

| | | | |
|---|---|---|---|
| 2009/0039333 A1* | 2/2009 | Chang .................. | H10N 70/826 |
| | | | 438/102 |
| 2013/0343110 A1* | 12/2013 | Liu .................... | H05K 7/20909 |
| | | | 363/141 |

(Continued)

OTHER PUBLICATIONS

"Chinese Application Serial No. 202311114175.0, Notification to Make Rectification mailed Oct. 13, 2023", with English translation, 2 pages.

*Primary Examiner* — Mark A Connolly
(74) *Attorney, Agent, or Firm* — Schwegman Lundberg & Woessner, P.A.

(57) ABSTRACT

Some memory sub-systems are operated in high temperature and low airflow environments. As a safeguard, thermal throttling may limit throughput on a memory sub-system when a predetermined temperature is reached or exceeded. Improving heat dissipation increases the amount of time a memory sub-system can operate without initiating thermal throttling. Adding a phase-change material (PCM) with a melting temperature above the ambient temperature but below the thermal throttling temperature to a memory sub-system increases the amount of heat the memory sub-system can generate before the temperature reaches the thermal throttling temperature. Thermally coupling components with a heat spreading sheet causes the temperature of the components to vary less than when the components transfer heat by air. Thus, a component that generates less heat may be used to absorb heat generated by another component, increasing the amount of time before any component reaches the thermal throttling temperature.

20 Claims, 8 Drawing Sheets

(56) References Cited

U.S. PATENT DOCUMENTS

| | | | |
|---|---|---|---|
| 2015/0200150 A1* | 7/2015 | Kim ................... | H01L 23/3738 |
| | | | 257/713 |
| 2019/0269037 A1* | 8/2019 | Hill ................... | H05K 7/20945 |
| 2022/0026962 A1* | 1/2022 | Ap ....................... | G06F 1/1698 |
| 2022/0123519 A1* | 4/2022 | Kanskar ............. | H01S 5/02423 |
| 2023/0301036 A1* | 9/2023 | Gregory ................ | G06F 1/203 |
| | | | 361/679.53 |

* cited by examiner

DEVICE WITHOUT
HEAT SPREADER
OR PCM SHEET

DEVICE WITH HEAT
SPREADER
AND PCM SHEET

300

600

710

ADD A MEMORY COMPONENT TO A PRINTED CIRCUIT BOARD (PCB)

720

ADD A PROCESSING DEVICE COUPLED TO THE MEMORY COMPONENT
TO THE PCB

730

APPLY A PHASE CHANGE MATERIAL (PCM) TO THE PCB, SUCH THAT
THE PCM IS THERMALLY COUPLED TO THE MEMORY COMPONENT TO
ALLOW COOLING OF THE MEMORY COMPONENT

THERMAL IMPROVEMENTS FOR MEMORY SUB-SYSTEMS

PRIORITY APPLICATION

This application claims the priority to Indian Patent Application Serial Number 202241049778, filed Aug. 31, 2022, which is incorporated herein by reference in its entirety.

TECHNICAL FIELD

The present disclosure generally relates to memory sub-systems, and more specifically, relates to thermal improvements for memory sub-systems.

BACKGROUND

A memory sub-system can be a storage system, such as a solid-state drive (SSD), and can include one or more memory components that store data. The memory components can be, for example, non-volatile memory components and volatile memory components. The memory components can be affixed to a printed circuit board (PCB). In general, a host system can utilize a memory sub-system to store data at the memory components and to retrieve data from the memory components.

Executing memory access commands generates heat. If the temperature of a memory sub-system exceeds a safe operating temperature, data may be lost or the memory sub-system may be permanently damaged. The memory sub-system may include a thermal sensor to monitor the temperature of the memory sub-system. To prevent over-heating, in response to detecting that the temperature has reached a predetermined threshold, the rate of processing memory access commands may be reduced. This is referred to as thermal throttling.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
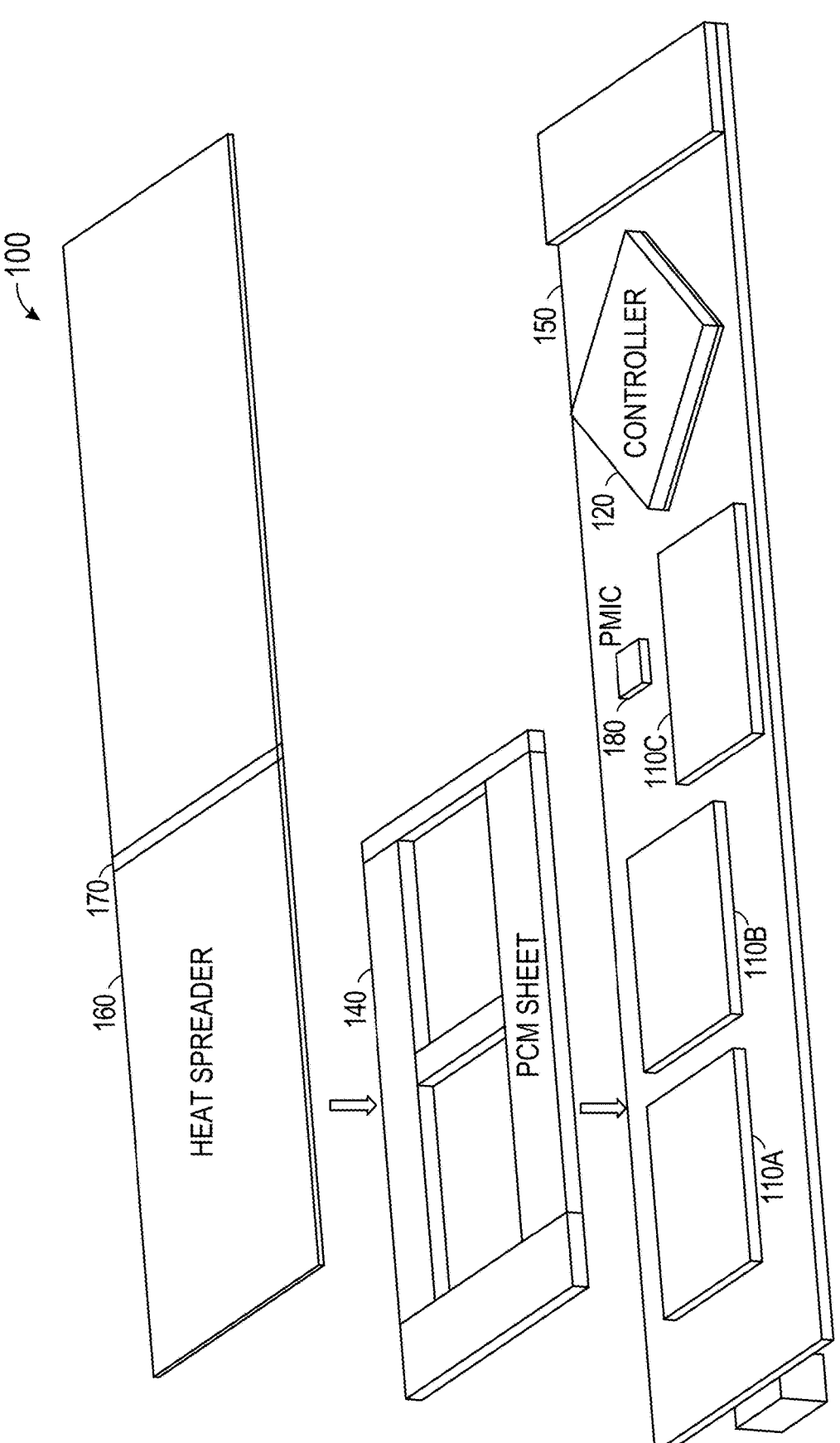
FIG. 1 illustrates an example memory sub-system in accordance with some embodiments of the present disclosure.

Aspects of the present disclosure are directed to a memory sub-system with increased time to thermal throttling. In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

Some memory sub-systems are operated in high temperature (e.g., above 50 degrees Centigrade) and low airflow (e.g., close to zero linear feet per minute (LFM)) environments. For larger devices, fans and cooling fins may be used to dissipate heat. Smaller devices may not have room for the additional components. As a safeguard, thermal throttling may limit throughput on a memory sub-system when a predetermined temperature is reached or exceeded. Improving heat dissipation increases the amount of time a memory sub-system can operate without initiating thermal throttling.

PCMs absorb substantial energy when transitioning from solid to liquid. Adding a PCM with a melting temperature above the ambient temperature but below the thermal throttling temperature to a memory sub-system increases the amount of heat the memory sub-system can generate before the temperature reaches the thermal throttling temperature.

Graphite and copper have high thermal conductivities (i.e., at least 100 W/mK) and conduct heat well. When multiple components are thermally coupled by a graphite or copper sheet, the temperature of the components varies less than when the components transfer heat by air. Thus, a component that generates less heat may be used to absorb heat generated by another component, increasing the amount of time before any component reaches the thermal throttling temperature. Alternatively, two heat-generating components may be thermally isolated to prevent one from overheating the other.

As used herein, components are thermally coupled when connected by substances having thermal conductivities greater than one W/mK. Thus, components are thermally coupled by a graphite or copper sheet when the components are thermally coupled and at least part of the connection between the components comprises a graphite or copper sheet. In some example embodiments, the components are thermally coupled by the graphite or copper sheet by being in contact with the graphite or copper sheet. Various example embodiments described herein discuss components being thermally coupled. In each of these embodiments, components may be "tightly thermally coupled." As used herein, components are tightly thermally coupled when connected by substances having thermal conductivities greater than one hundred W/mK.

By using a PCM, a graphite or copper sheet, or both in a memory sub-system as described herein, the performance of the memory sub-system is improved by increasing the amount of data that can be read from or written to the memory sub-system before thermal throttling begins. Additionally, the application of a PCM to the memory sub-system may improve the stability of the memory sub-system with respect to shock, vibration, and warpage.

Figure 8:
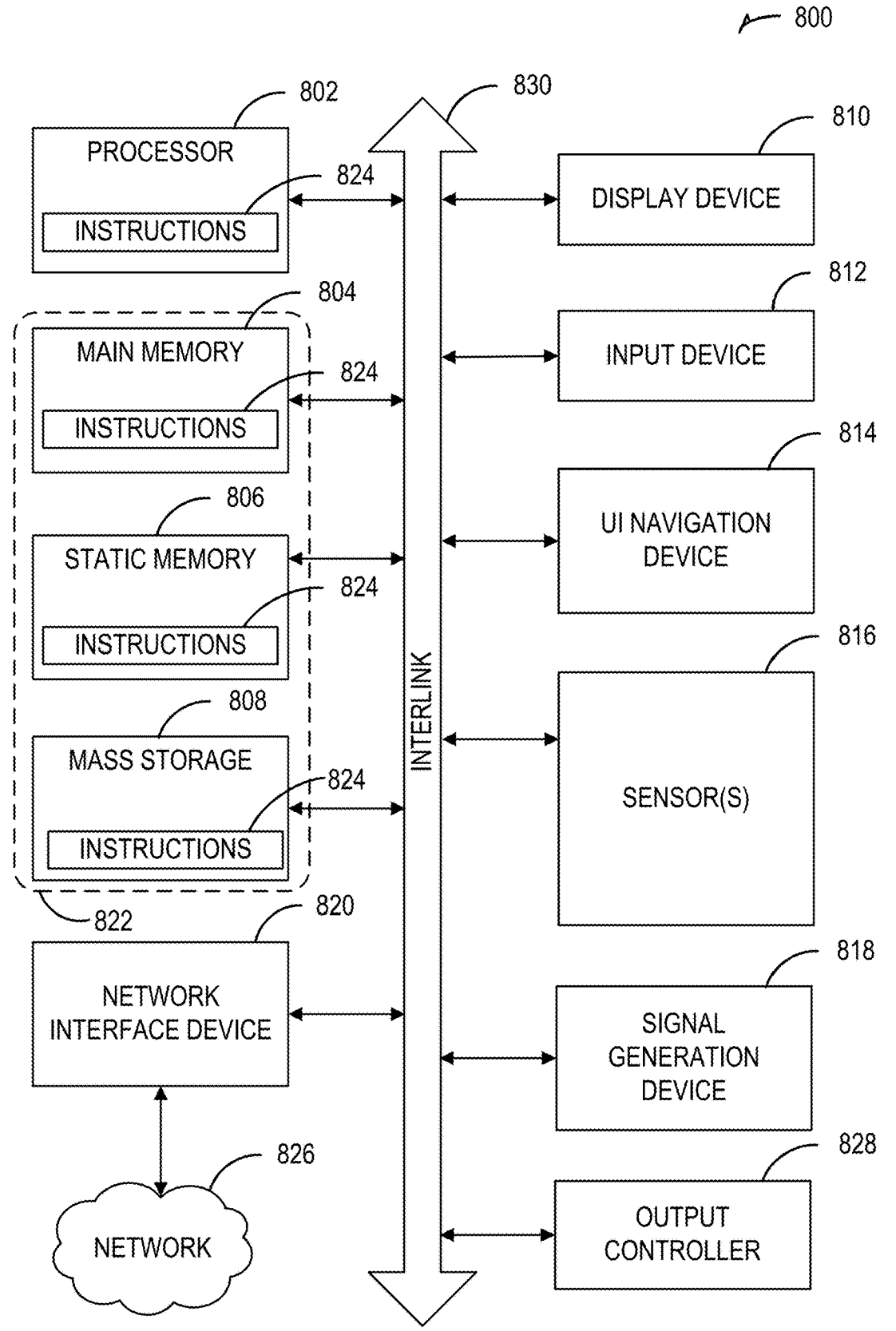
FIG. 8 illustrates an example machine of a computer system within which a set of instructions, for causing the machine to perform any one or more of the methodologies discussed herein, can be executed.

FIG. 1 illustrates an example memory sub-system 100 in accordance with some embodiments of the present disclosure. The sub-system 100 can include memory components 110A, 110B, and 110C. The memory components 110A-110C can be volatile memory components, non-volatile memory components, or a combination of such. In some embodiments, the memory sub-system 100 is a storage system. An example of a storage system is an SSD. In some embodiments, the memory sub-system 100 is a hybrid memory/storage sub-system. In general, the memory sub-system 100 may be part of or coupled to a host system that uses the memory sub-system 100. For example, the host system can write data to the memory sub-system 100 and read data from the memory sub-system 100. An example host system is shown in FIG. 8.

The host system can be a computing device such as a desktop computer, laptop computer, network server, mobile device, or such computing device that includes a memory and a processing device. The host system can include or be coupled to the memory sub-system 100 so that the host system can read data from or write data to the memory sub-system 100. The host system can be coupled to the memory sub-system 100 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system and the memory sub-system 100. The host system can further utilize an NVM Express (NVMe) interface to access the memory components 110A-110C when the memory sub-system 100 is coupled with the host system by the PCIe interface. The physical host interface can provide an interface for passing control, address, data, and other signals between the memory sub-system 100 and the host system.

The memory components 110A-110C can include any combination of the different types of non-volatile memory components and/or volatile memory components. An example of non-volatile memory components includes a negative-and (NAND) type flash memory. Each of the memory components 110A-110C can include one or more arrays of memory cells such as SLCs, or MLCs (e.g., triple level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system. Although non-volatile memory components such as NAND type flash memory are described, the memory components 110A-110C can be based on any other type of memory such as a volatile memory. In some embodiments, the memory components 110A-110C can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 110A-110C can be grouped as memory pages or data blocks that can refer to a unit of the memory component used to store data.

The memory system controller 120 (hereinafter referred to as "controller") can communicate with the memory components 110A-110C to perform operations such as reading data, writing data, or erasing data at the memory components 110A-110C and other such operations. The controller 120 can include hardware such as one or more integrated circuits and/or discrete components, a buffer memory, or a combination thereof. The controller 120 can be a microcontroller, special purpose logic circuitry (e.g., a field programmable gate array (FPGA), an application specific integrated circuit (ASIC), etc.), or other suitable processor. The controller 120 can include a processor (processing device) configured to execute instructions stored in local memory. For example, the local memory of the controller 120 may include an embedded memory configured to store instructions for performing various processes, operations, logic flows, and routines that control operation of the memory sub-system 100, including handling communications between the memory sub-system 100 and the host system. In some embodiments, the local memory can include memory registers storing memory pointers, fetched data, etc. The local memory can also include read-only memory (ROM) for storing micro-code. The local memory may include a logical-to-physical table for lookup of physical addresses in the memory components 110A-110C from logical addresses used by the host.

While the example memory sub-system 100 in FIG. 1 has been illustrated as including the controller 120, in another embodiment of the present disclosure, a memory sub-system 100 may not include a controller 120, and may instead rely upon external control (e.g., provided by an external host, or by a processor or controller separate from the memory sub-system).

In general, the controller 120 can receive commands or operations from the host system and can convert the commands or operations into instructions or appropriate commands to achieve the desired access to the memory components 110A-110C. The controller 120 can be responsible for other operations such as wear leveling operations, garbage collection operations, error detection and error-correcting code (ECC) operations, encryption operations, caching operations, and address translations between a logical address and a physical address that are associated with the memory components 110A-110C. The controller 120 can further include host interface circuitry to communicate with the host system via the physical host interface. The host interface circuitry can convert the commands received from the host system into command instructions to access the memory components 110A-110C as well as convert responses associated with the memory components 110A-110C into information for the host system.

The memory sub-system 100 can also include additional circuitry or components that are not illustrated. In some embodiments, the memory sub-system 100 can include a cache or buffer (e.g., DRAM) and address circuitry (e.g., a row decoder and a column decoder) that can receive a logical address from the controller 120 and decode the logical address to one or more physical addresses at the memory components 110A-110C.

The memory sub-system 100 of FIG. 1 may process read requests and write requests and provide read and write responses. Generally, a write request includes a data unit to be written to the memory sub-system 100 and a logical address referring to that data unit. The memory sub-system 100 executes a write operation to write the data unit to one or more physical addresses of the memory components 110A-110C. For example, the write operation may be executed by the memory system controller 120. The write operation includes generating an L2P entry for the data unit. The L2P entry relates the logical address for the data unit provided with the write request to the physical address or addresses at the memory component to which the data unit is written. The write operation may include generating a write temperature data. For example, the memory sub-system 100 receives a temperature signal from a temperature sensor at the memory components 110A-110C. One or more temperature sensors may be placed at some or all of the memory components 110A-110C (e.g., at memory components 110A and 110B).

The memory sub-system 100 condenses the temperature signal to a write temperature data. For example, the memory sub-system 100 compares the write temperature indicated by the temperature signal to a set of temperature ranges, where each of the set of temperature ranges corresponds to a temperature code value. The write temperature data is the temperature code value corresponding to the temperature range of the set of temperature ranges that describes the temperature signal. The memory sub-system 100 embeds the write temperature data to the L2P entry. The L2P entry with the write temperature data embedded therein is written to the L2P table.

A read request includes a logical address from which data is to be read. For example, the read request may include the same logical address as the example write request discussed above. In that case, the read request refers to the same data unit as the write request. The memory sub-system 100 responds to the read request by executing a read operation. For example, the read operation may be executed by the memory system controller 120.

The read operation includes accessing the L2P entry generated during the write operation. The L2P entry may be accessed from the L2P table. The memory sub-system 100 uses the L2P entry to determine the physical address or addresses that correspond to the logical address indicated by the read operation. The memory sub-system 100 reads the physical address or addresses at the memory components 110A-110C to retrieve the data unit. The data unit is then returned to the host system in a read response message.

In some examples, prior to reading the physical address, the memory sub-system 100 accesses the write temperature data embedded with the L2P entry. Based on the write temperature data, the memory sub-system 100 determines one or more offset threshold voltages based on the write temperature data. This may be performed in any suitable manner. For example, the memory sub-system 100 may compare the write temperature data to a reference. In some examples, the reference includes a read temperature signal received from a temperature sensor. Based on the comparison, the memory sub-system 100 determines a difference between the write temperature indicated by the write temperature data and the read temperature indicated by the read temperature signal. If the difference is greater than a threshold, the memory sub-system 100 generates one or more offset threshold voltages based on the difference.

In some examples, the reference includes a read temperature code. The memory sub-system 100 generates the read temperature code using the read temperature signal from the temperature sensor. This includes, for example, comparing the read temperature signal to a set of temperature ranges. The set of temperature ranges used to generate the read temperature code at the read operation may be the same set of temperature ranges used to generate the write temperature data during the write operation. The memory sub-system 100 determines that the read temperature code is equivalent to the temperature code value corresponding to the temperature range of the set of temperature ranges that describes the read temperature signal. The memory sub-system 100 compares the read temperature code to the write temperature data from the L2P entry to determine a difference between the write temperature data and the read temperature code. If the difference is greater than a threshold, the memory sub-system 100 generates one or more offset threshold voltages based on the difference.

In some examples, the reference includes a nominal temperature code. The nominal temperature code represents a nominal temperature range. For example, the nominal temperature code may be the temperature code value corresponding to a temperature range of the set of temperature ranges at which the memory sub-system 100 is most likely to operate. Using a nominal temperature code in this way includes assuming that the memory sub-system 100 is operating within the nominal temperature range. The memory sub-system 100 compares the nominal temperature code to the write temperature data from the L2P entry to determine a difference between the write temperature data and the nominal temperature code. If the difference is greater than a threshold, the memory sub-system 100 generates one or more offset threshold voltages based on the difference.

Although the read operation and write operation are described herein as being executed by the memory sub-system 100 (e.g., the controller 120 thereof), in some examples, read and write operations, as described herein, may be executed at the host system. Also, the write request and read request may originate at the host system or may be initiated at the memory sub-system 100.

In some examples, the logic for executing the read operation and/or the write operation is split between the memory sub-system 100 (e.g., the controller 120) and the various memory components 110A-110C. For example, the local memory component 110C may include instructions for handling portions of the read request and write request described herein. Similarly, the memory components 110A and 110B may similarly include instructions for handling portions of the read request and write request described herein. For example, the controller 120 (e.g., executing instructions stored in memory component 110C) may identify an L2P table entry corresponding to a read request and identify a write temperature data embedded in the L2P entry. The controller 120 provides the write temperature data to the appropriate memory component 110A, 110B. The memory component, for example, processing logic at the memory component 110A, 110B uses the write temperature data as described herein to read the physical address. On a write request, the memory component 110A, 110B reads an associated temperature sensor and provides the temperature signal to the controller 120. The controller 120 generates the write temperature data, embeds the write temperature data to an L2P table entry, and writes the L2P table entry to the L2P table.

When the temperature sensor reports that the temperature has reached or exceeded a predetermined threshold (e.g., 70 degrees Centigrade), the controller 120 slows the rate at which memory operations are performed to reduce the generation of heat (e.g. thermal throttling). Application of the PCM sheet 140 to the PCB 150 and in contact with the memory components 110A and 110B allows heat generated by the memory components 110A-110B to be absorbed by the PCM sheet 140, maintaining the temperature at the phase-change temperature of the PCM sheet 140 until the phase change is complete. By using a PCM sheet 140 with a phase-change temperature below the predetermined threshold used for thermal throttling and above the ambient temperature, the amount of heat that can be generated by the memory components 110A-110B before thermal throttling begins is increased.

The heat spreader 160 may be formed of a substance with high thermal conductivity (i.e., a thermal conductivity of at least 100 W/mK, such as copper, graphite, or graphene). Application of the heat spreader 160 to the memory components 110A-110B increases the surface area that radiates heat, increasing the ability of the memory sub-system 100 to dissipate heat and increasing the amount of heat that can be generated by the memory components 110A-110B before thermal throttling begins.

Additionally, application of the heat spreader 160 to other components that generate less heat (e.g., the memory component 110C) allows transference of heat to those other components, further increasing the amount of heat that can be generated by the memory components 110A-110B before thermal throttling begins.

Thermal isolation component 170 may be used to separate the memory sub-system 100 into two or more heat domains. Thermal isolation component 170 is made of a thermally resistant material with thermal conductivity less than one W/mK. In some example embodiments, thermal isolation component 170 is made of a strongly thermally resistant material with thermal conductivity less than 0.1 W/mK. The heat spreader 160 spreads heat within each heat domain but not between heat domains. Thus, in the example of FIG. 1, power-management integrated circuit (PMIC) 180, a high-temperature component, is thermally isolated from the memory components 110A-110B, and heat from the PMIC 180 is not transferred to the memory components 110A-110B. In the heat domain including the PMIC 180, the heat spreader 160 may dissipate heat from the PMIC 180, the controller 120, the memory component 110C, or any suitable combination thereof.

As shown in FIG. 1, the heat spreader 160 may be used in conjunction with the PCM sheet 140, resulting in the memory sub-system 100 enjoying the benefits of both components. As a result, the duration of time that the memory sub-system 100 may perform at full speed for a host before the rate of operations is reduced due to thermal throttling is increased.

Figure 2:
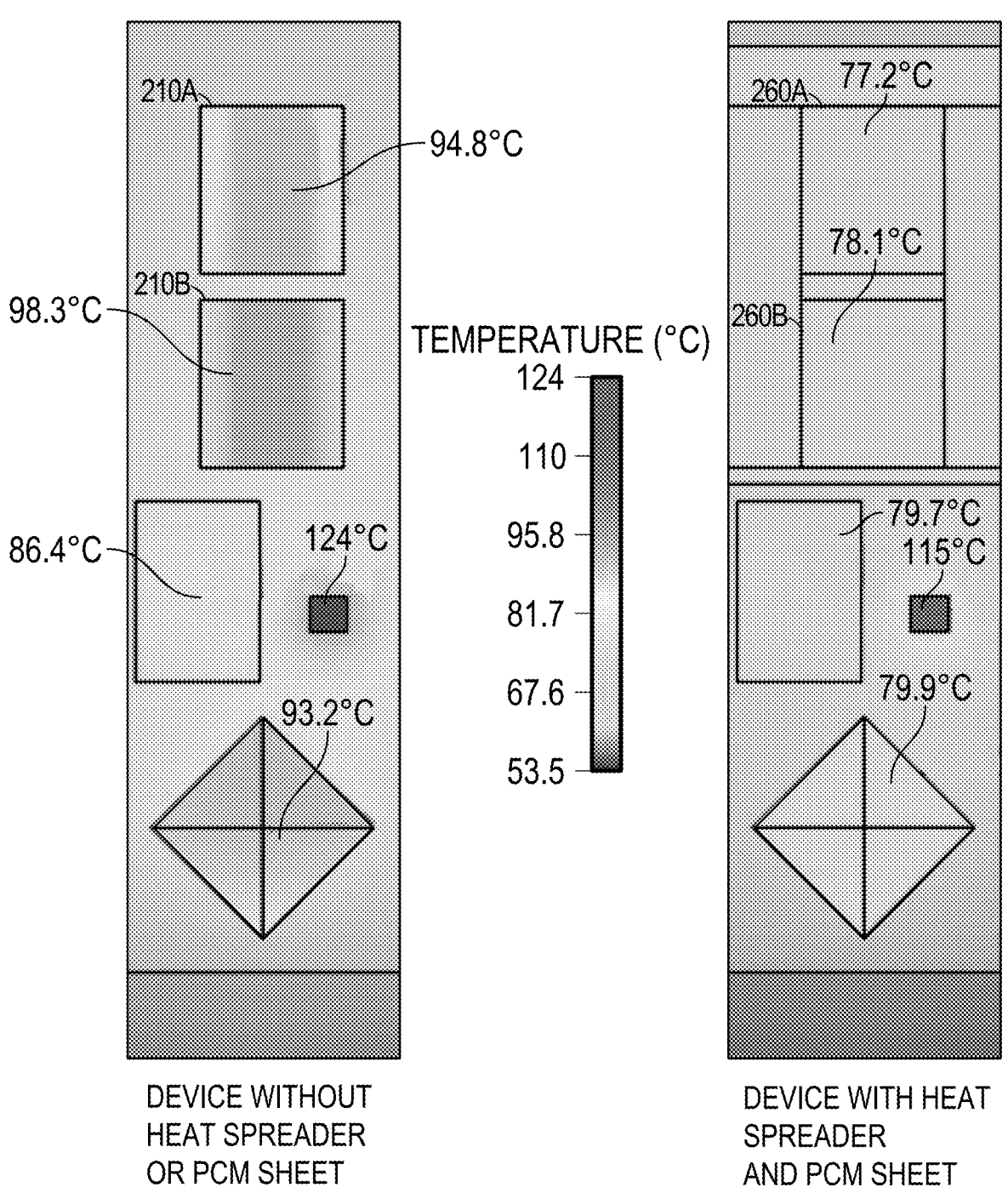
FIG. 2 illustrates heat distribution on two memory sub-systems, one using heat mitigation technologies discussed herein and one that does not make use of them.

FIG. 2 illustrates heat distribution on two memory sub-systems, one using heat mitigation technologies discussed herein and one that does not make use of them. The two illustrations show the temperatures of various components after the same amount of operating time in the same ambient temperature. As can be seen in the figure, the memory components 210A-210B of the device not making use of a PCM sheet or heat spreader reached 94.8° C. and 98.3° C. while the memory components 260A-260B of the device using a PCM sheet and a heat spreader only reached 77.2° C. and 78.1° C., a reduction of nearly 20° C. All other components also show a reduced temperature.

Figure 3:
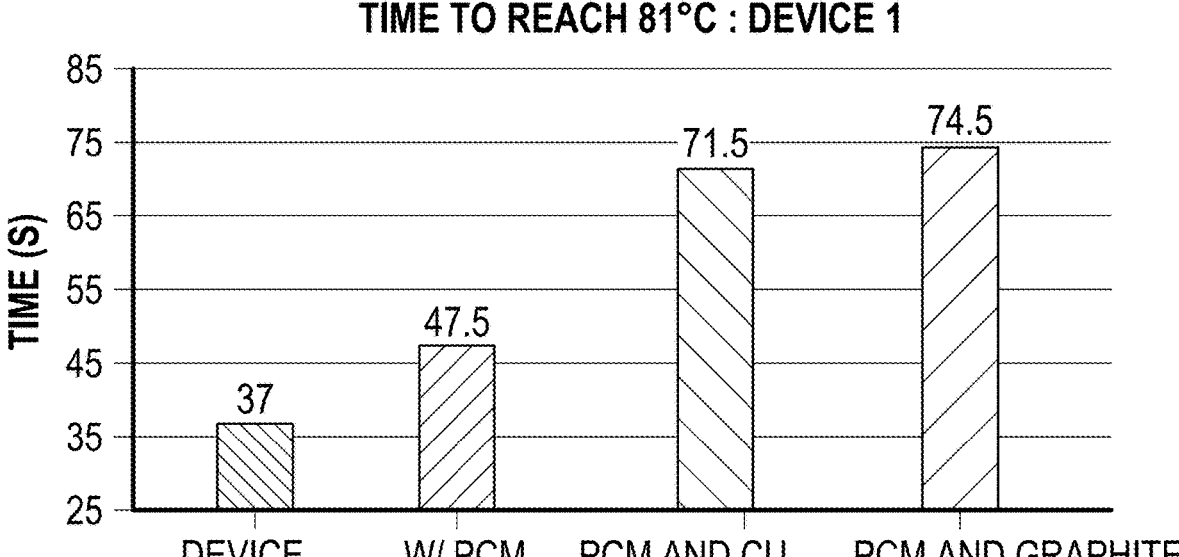
FIG. 3 is a pair of graphs that show the time to reach 81 degrees Centigrade for different devices using different heat mitigation technologies discussed herein.
Figure 3:
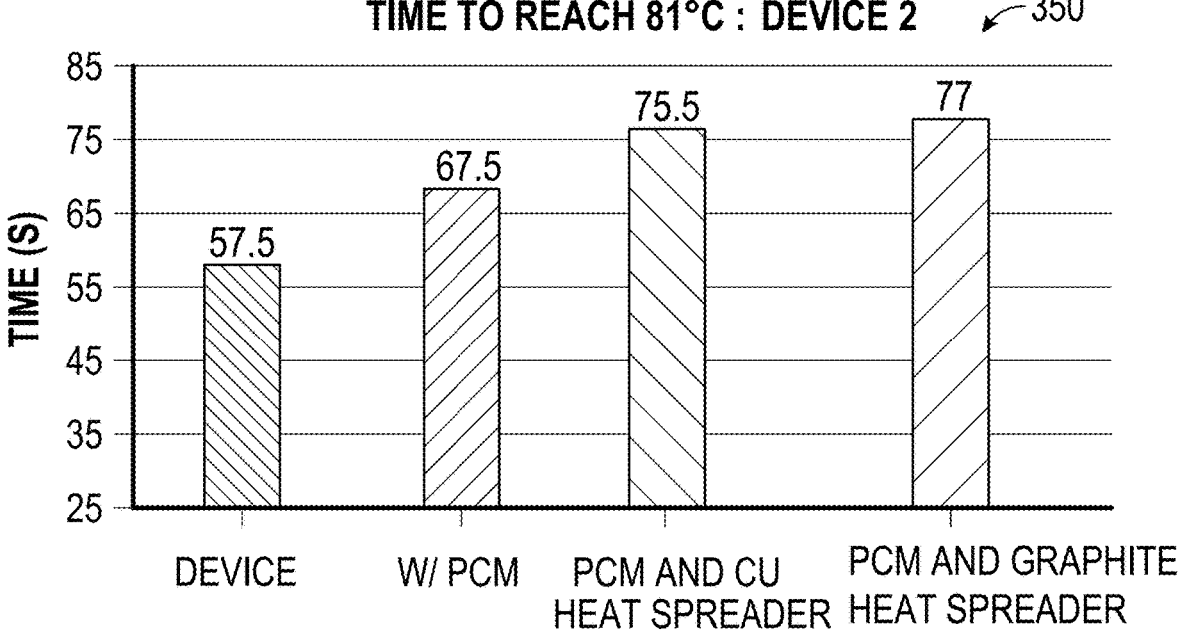

FIG. 3 is a pair of graphs 300 and 350 that show the time to reach 81 degrees Centigrade for different devices using different heat mitigation technologies discussed herein. As can be seen in the graphs 300 and 350, using the PCM sheet increased the time to reach 81° C. by about 10 seconds in each device. Adding a heat spreader further increased the time to reach 81° C. by 8-37 seconds.

Figure 4:
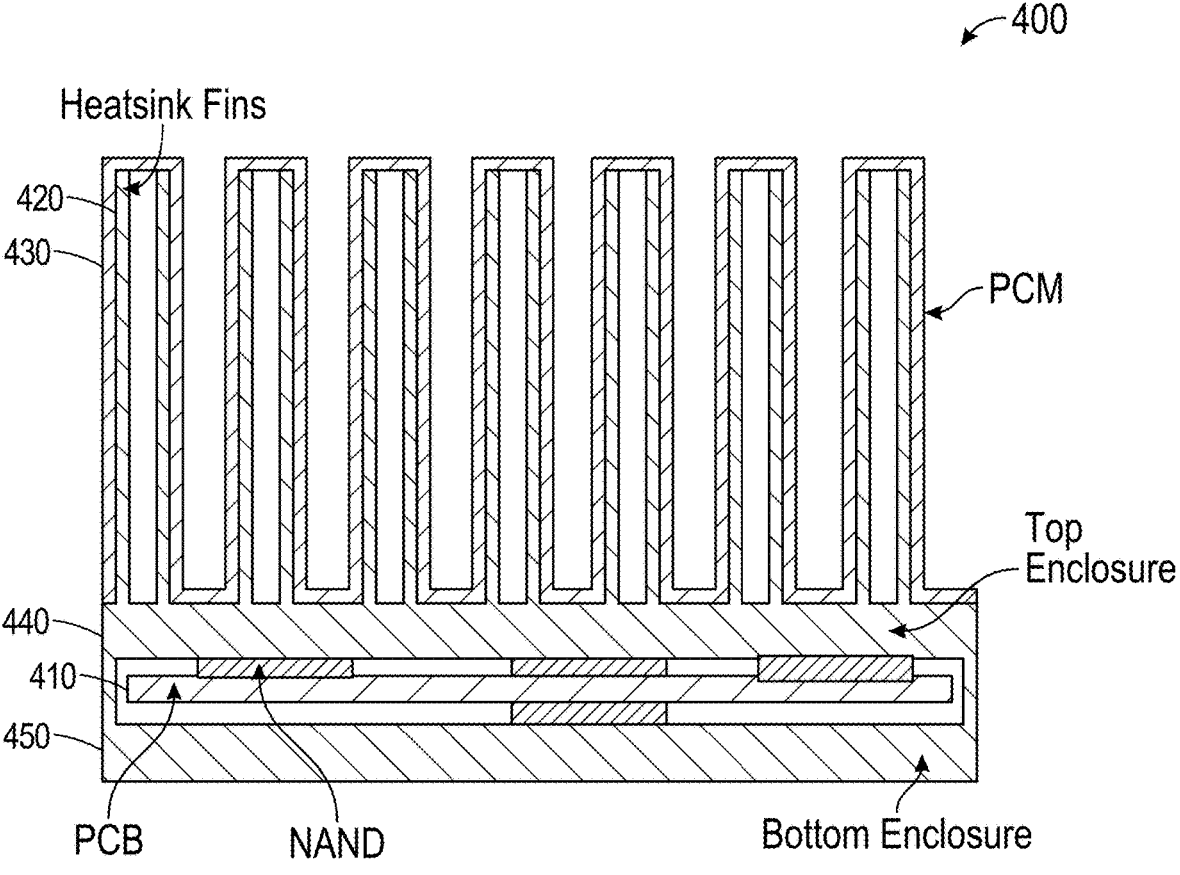
FIG. 4 illustrates a memory sub-system comprising a PCB using heatsink fins and a phase change material (PCM) to increase time to thermal throttling, in accordance with some embodiments of the present disclosure.

FIG. 4 illustrates a memory sub-system 400 comprising a PCB 410 using heatsink fins 420 and a PCM 430 to increase time to thermal throttling, in accordance with some embodiments of the present disclosure. Components (e.g., the memory components 110A-110C) are affixed to the PCB 410 and placed in contact with the top enclosure 440 or the bottom enclosure 450. The contact between the components and the enclosures increases the rate of heat transfer as compared to air-mediated heat transfer. The heatsink fins 420 increase the surface area of the top enclosure 440, increasing the rate at which heat is transferred out of the memory sub-system 400 into the ambient environment. By applying PCM 430 to the surface of the heatsink fins 420, the amount of heat that may be generated by the memory sub-system 400 before the memory sub-system 400 reaches a thermal throttling temperature is increased. The PCM 430 of FIG. 4 is indirectly thermally coupled to the memory components via the heatsink fins 420. By comparison, the PCM sheet 140 of FIG. 1 is directly thermally coupled to the memory components 110A-110B because there is no inter-mediating material.

The surface area of the PCM 430 is very close to the surface area of the heatsink fins 420. Accordingly, the rate at which heat is transferred out of the memory sub-system 400 is substantially unchanged. Thus, the rate at which memory operations can be performed by the memory sub-system 400 once thermal throttling begins is essentially the same as for a device lacking the PCM 430.

Figure 5:
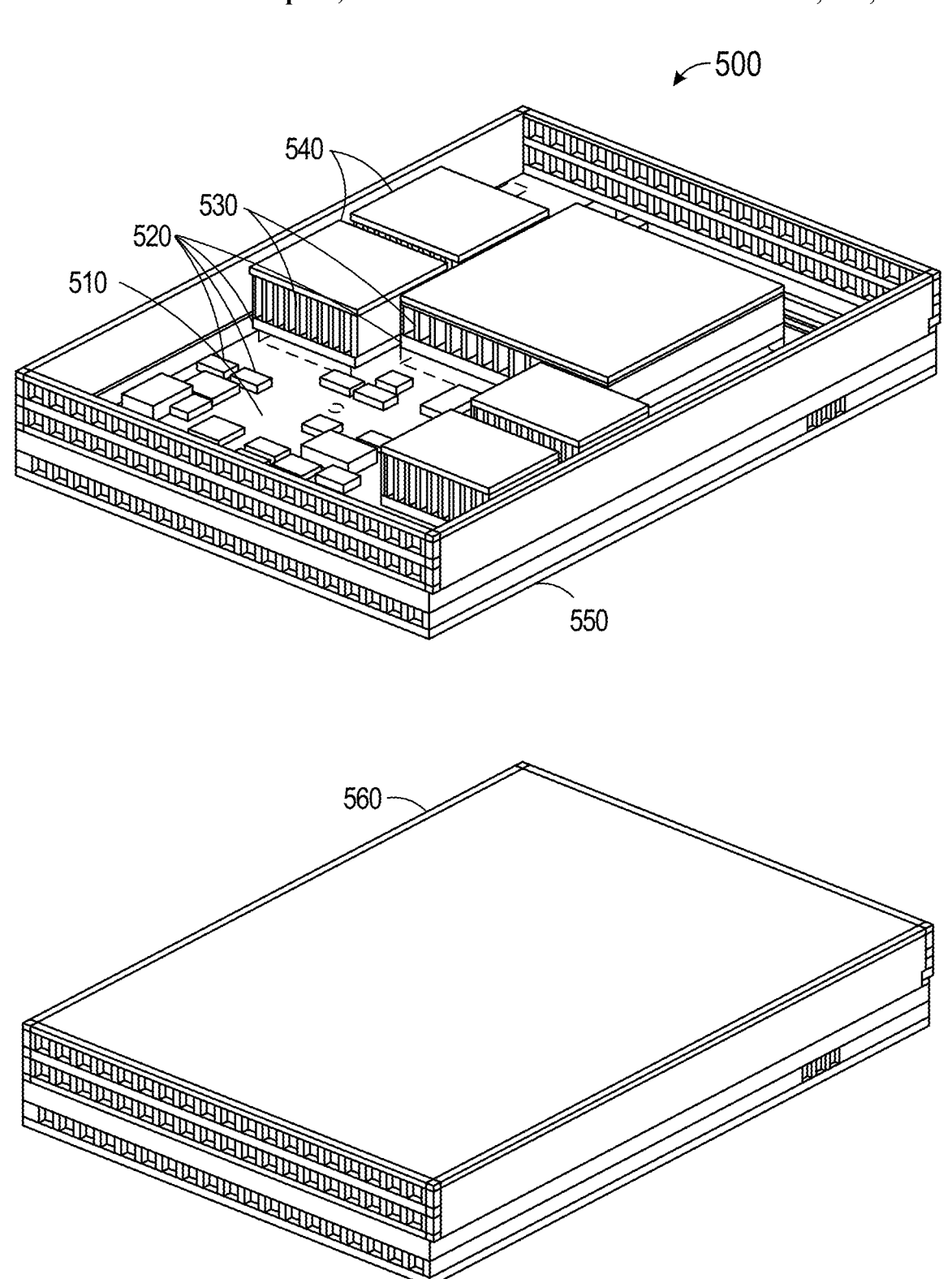
FIG. 5 illustrates an example memory sub-system in accordance with some embodiments of the present disclosure.

FIG. 5 illustrates an example memory sub-system 500 in accordance with some embodiments of the present disclosure. The memory sub-system 500 comprises an enclosure base 550 containing a PCB 510 with multiple components 520 affixed. One or more of the components 520 is thermally coupled to heat fins 530. PCM 540 is placed on top of the heat fins 530. The enclosure top 560 is connected to the enclosure base 550 and, by so doing, is placed in contact with the PCM 540, and thus is directly thermally coupled to the PCM 540. The large surface area of the PCM 540 in contact with the enclosure top 560 increases the rate at which heat is transferred from the interior of the memory sub-system 500 to the enclosure top 560, thus increasing the rate at which heat is transferred from the enclosure top 560 into the ambient environment. As a result, the rate at which operations may be performed during thermal throttling is increased. In addition to dissipating heat at a faster rate by virtue of the contact area of the PCM 540 with the enclosure top 560, the use of the PCM 540 with the heat fins 530 increases the amount of heat that can be generated by the memory sub-system 500 before the thermal throttling temperature is reached.

In some example embodiments, the enclosure top 560 is indirectly thermally coupled to the PCM 540. For example, a larger enclosure may be used and a metal component added to thermally couple the PCM 540 with the enclosure top 560.

Figure 6:
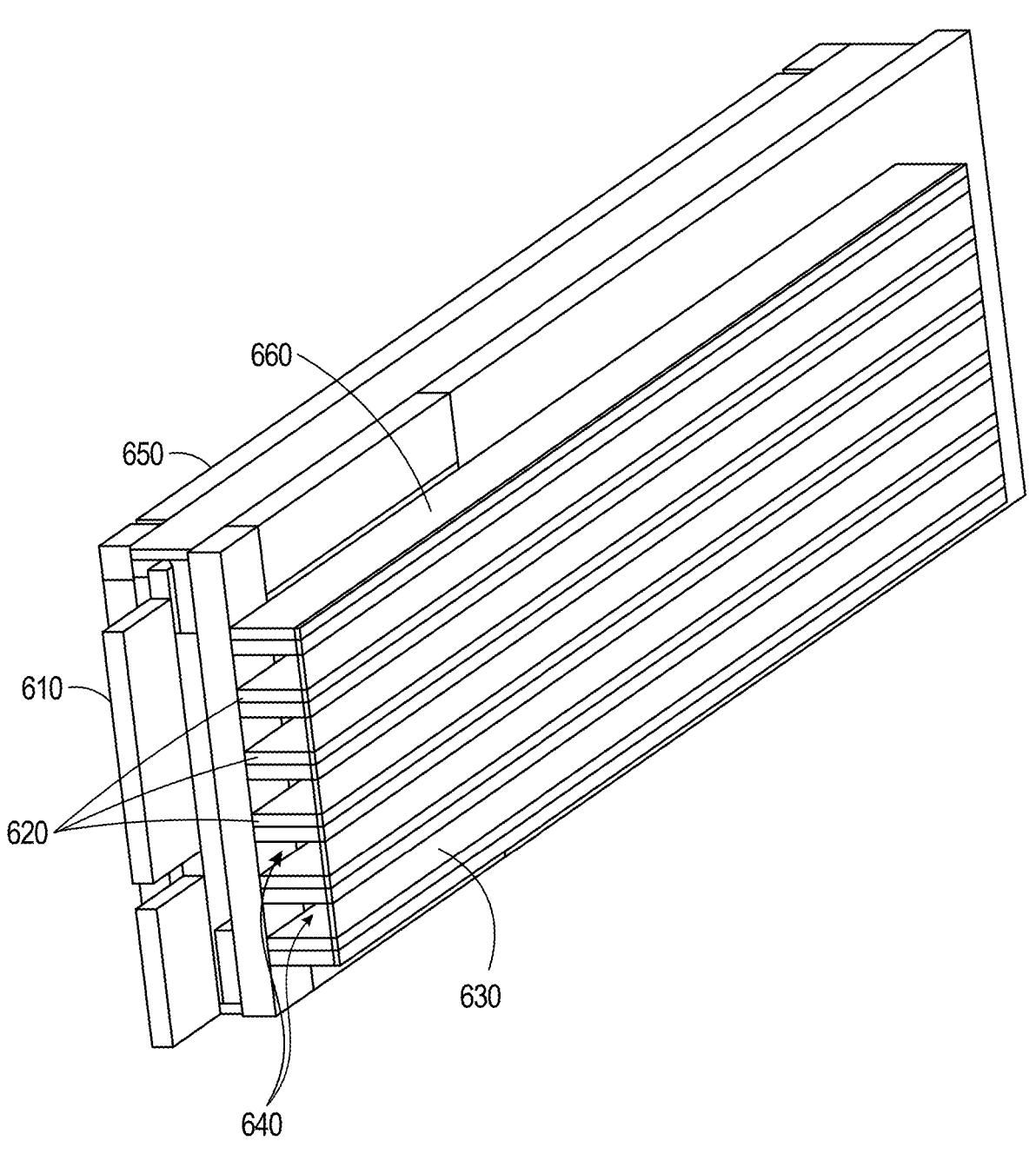
FIG. 6 illustrates an example memory sub-system in accordance with some embodiments of the present disclosure.

FIG. 6 illustrates an example memory sub-system 600 in accordance with some embodiments of the present disclosure. The memory sub-system 600 comprises an enclosure base 650 and an enclosure top 660 containing a PCB 610 with multiple components affixed. The enclosure top 660 includes heat fins 620 and a PCM heatsink 630. Heat from the heat fins 620 is absorbed by the PCM heatsink 630. Due to the high heat capacity of the PCM heatsink 630, the amount of heat that can be generated by the memory sub-system 600 before thermal throttling begins is increased as compared to memory sub-systems that have the heat fins 620 dissipate heat into air. The PCM heatsink 630 has a smaller surface area than the heat fins 620 if air is not pushed through the tubes 640. Thus, the rate at which operations may be performed once thermal throttling begins may be lower than when the PCM heatsink 630 is not used. If air is circulated through the tubes 640, the surface area of the PCM heatsink 630 is effectively larger than the surface area of the heat fins 620 and the rate at which operations may be performed once thermal throttling begins may be greater than when the PCM heatsink 630 is not used.

Figure 7:
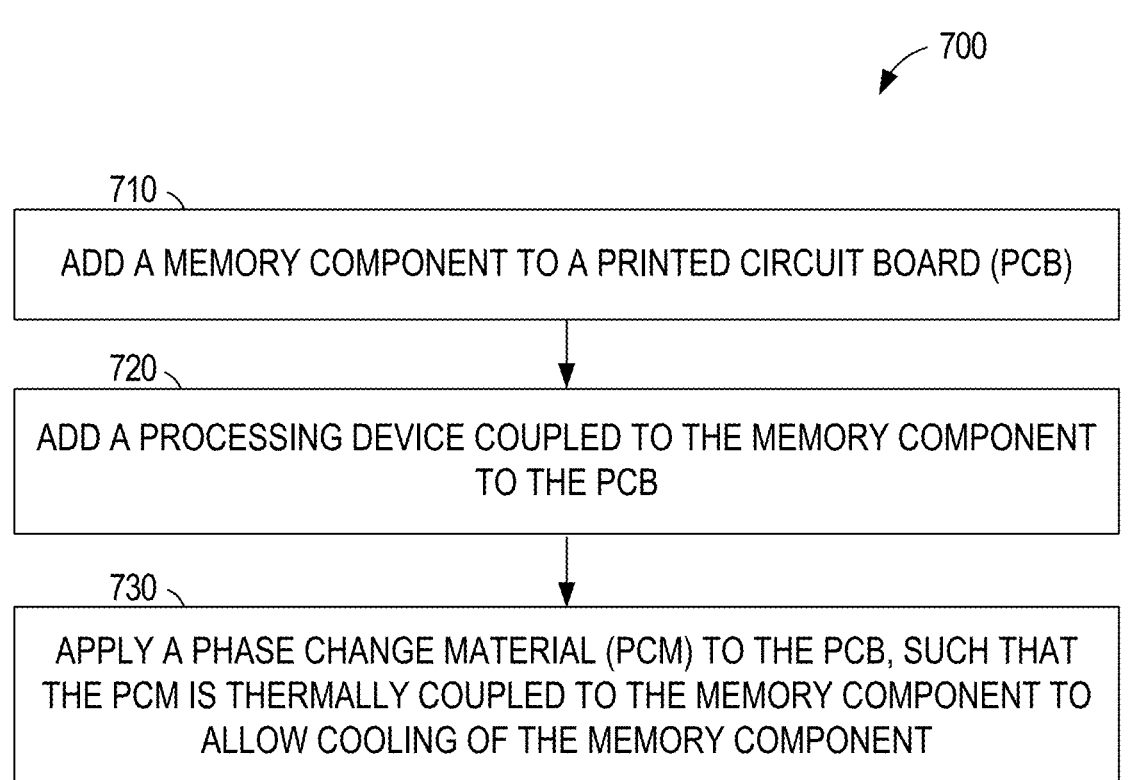
FIG. 7 is a flow diagram of an example method to assemble a memory sub-system with a PCM to increase time to thermal throttling, in accordance with some embodiments of the present disclosure.

FIG. 7 is a flow diagram of an example method 700 to assemble a memory sub-system with a PCM to increase time to thermal throttling, in accordance with some embodiments of the present disclosure. The method 700 includes steps 710, 720, and 730.

In step 710, a memory component is added to a PCB. For example, a NAND flash memory may be soldered onto the PCB. Multiple memory components may be added to the PCB by repetition of step 710. For example, the memory components 110A-110C of the memory sub-system 100 of FIG. 1 may be added to the PCB.

A processing device is coupled to the memory component and added to the PCB, in step 720. For example, the controller 120 may be soldered onto the PCB and the PCB may have been printed to include electrical connections from the solder points used by the controller 120 to the solder points used by the memory component 110A. Multiple processing devices may be added to the PCB by repetition of step 720. For example, the PMIC 180 and the controller 120 may both be processing devices coupled to one or more of the memory components 110A-110C.

In step 730, a PCM is applied to the PCB, such that the PCM is thermally coupled to the memory component to allow cooling of the memory component. For example, the PCM sheet 140 may be added to the memory sub-system 100 to allow cooling of the memory components 110A and 110B. As shown in FIG. 1, the PCM sheet 140 is in physical contact with the surface of the memory components 110A and 110B. The PCM sheet may be in physical contact with multiple sides of the memory component or a single side of the memory component. In the example of FIG. 1, the PCM sheet 140 is in contact with four sides of each memory component 110A, 110B. As another example, the PCM sheet may be in contact with the top of the memory component. Step 730 may be repeated for each memory component added by repetition of step 710 or a single PCM sheet may be placed that is thermally coupled to multiple memory components, as shown in FIG. 1.

As an additional step, a heat spreader may be thermally coupled to the PCM, the memory components, a processing device, or any suitable combination thereof. The heat spreader spread heats among the components and into the environment or an enclosure, dissipating heat from one or more of the components (e.g., from a processing device, a memory component, or both).

By use of the method 700, a memory sub-system is assembled that has improved ability to absorb heat that is generated by memory components. This allows the memory sub-system to operate at full capacity for a longer period of time before thermal throttling begins, as compared to memory sub-systems that do not make use of a PCM sheet.

To better illustrate the methods and apparatuses described herein, a non-limiting set of Example embodiments are set forth below as numerically identified

EXAMPLES

Example 1 is a memory sub-system, comprising: a memory component; a processing device operably coupled to the memory component; and a phase change material (PCM) thermally coupled to the memory component to allow cooling of the memory component.

In Example 2, the subject matter of Example 1 includes, a heat spreader thermally coupled to the PCM to dissipate heat from the memory component.

In Example 3, the subject matter of Example 2 includes, wherein the heat spreader is a graphite heat spreader.

In Example 4, the subject matter of Examples 2-3 includes, wherein the heat spreader is a copper heat spreader.

In Example 5, the subject matter of Examples 2-4 includes, wherein the heat spreader is also thermally coupled to the processing device to dissipate heat from the processing device.

In Example 6, the subject matter of Example 5 includes, wherein the heat spreader comprises a thermal isolator that thermally isolates a first portion of the memory sub-system from a second portion of the memory sub-system, the first portion comprising the memory component and the second portion comprising the processing device.

In Example 7, the subject matter of Examples 1-6 includes, wherein the PCM is directly connected to the memory component.

In Example 8, the subject matter of Examples 1-7 includes, heatsink fins thermally coupled to the memory component, wherein the PCM is indirectly coupled to the memory component via the heatsink fins.

In Example 9, the subject matter of Examples 1-8 includes, an enclosure, wherein the PCM is thermally coupled to the enclosure.

In Example 10, the subject matter of Examples 1-9 includes, wherein the PCM increases the time the memory sub-system is able to be used before thermal throttling begins.

Example 11 is a method of manufacturing a memory sub-system comprising: adding a memory component to a printed circuit board (PCB); adding a processing device coupled to the memory component to the PCB; and applying a phase change material (PCM) to the PCB, such that the PCM is thermally coupled to the memory component to allow cooling of the memory component.

In Example 12, the subject matter of Example 11 includes, wherein the PCM is cut to match a shape of the memory component.

In Example 13, the subject matter of Examples 11-12 includes, applying a heat spreader to the memory sub-system, such that the heat spreader is thermally coupled to the PCM to dissipate heat from the memory component.

In Example 14, the subject matter of Example 13 includes, wherein the heat spreader is a graphite heat spreader.

In Example 15, the subject matter of Examples 13-14 includes, wherein the heat spreader is a copper heat spreader.

In Example 16, the subject matter of Examples 13-15 includes, wherein the heat spreader is also thermally coupled to the processing device to dissipate heat from the processing device.

In Example 17, the subject matter of Example 16 includes, wherein the heat spreader comprises a thermal isolator that thermally isolates a first portion of the memory sub-system from a second portion of the memory sub-system, the first portion comprising the memory component and the second portion comprising the processing device.

In Example 18, the subject matter of Examples 11-17 includes, wherein the PCM sheet is directly connected to the memory component.

In Example 19, the subject matter of Examples 11-18 includes, thermally coupling heatsink fins to the memory component, wherein the PCM is indirectly coupled to the memory component via the heatsink fins.

In Example 20, the subject matter of Examples 11-19 includes, enclosing the PCB in an enclosure, wherein the PCM is thermally coupled to the enclosure.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

FIG. 9 illustrates a block diagram of an example machine 900 with which, in which, or by which any one or more of the techniques (e.g., methodologies) discussed herein can be implemented. Examples, as described herein, can include, or can operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 900.

In alternative embodiments, the machine 900 can operate as a stand-alone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 800 (e.g., computer system) can include a hardware processor 802 (e.g., a central processing unit (CPU), a graphics processing unit (GPU), a hardware processor core, or any combination thereof), a main memory 804, a static memory 806 (e.g., memory or storage for firmware, microcode, a basic-input-output (BIOS), unified extensible firmware interface (UEFI), etc.), and mass storage device 808 (e.g., hard drives, tape drives, flash storage, or other block devices) some or all of which can communicate with each other via an interlink 830 (e.g., bus). The machine 800 can further include a display device 810, an alphanumeric input device 812 (e.g., a keyboard), and a user interface (UI) navigation device 814 (e.g., a mouse). In an example, the display device 810, the input device 812, and the UI navigation device 814 can be a touch screen display. The machine 800 can additionally include a signal generation device 818 (e.g., a speaker), a network interface device 820, and one or more sensor(s) 816, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 802, the main memory 804, the static memory 806, or the mass storage device 808 can be, or include, a machine-readable media 822 on which is stored one or more sets of data structures or instructions 824 (e.g., software) embodying or used by any one or more of the techniques or functions described herein. The instructions 824 can also reside, completely or at least partially, within any of registers of the hardware processor 802, the main memory 804, the static memory 806, or the mass storage device 808 during execution thereof by the machine 800. In an example, one or any combination of the hardware processor 802, the main memory 804, the static memory 806, or the mass storage device 808 can constitute the machine-readable media 822. While the machine-readable media 822 is illustrated as a single medium, the term "machine-readable medium" can include a single medium or multiple media (e.g., a centralized or distributed database, or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 822 can be representative of the instructions 824, such as instructions 824 themselves or a format from which the instructions 824 can be derived. This format from which the instructions 824 can be derived can include source code, encoded instructions (e.g., in compressed or encrypted form), packaged instructions (e.g., split into multiple packages), or the like. The information representative of the instructions 824 in the machine-readable media 822 can be processed by processing circuitry into the instructions to implement any of the operations discussed herein. For example, deriving the instructions 824 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 can include assembly, compilation, or interpretation of the information (e.g., by the processing circuitry) to create the instructions 824 from some intermediate or preprocessed format provided by the machine-readable media 822. The information, when provided in multiple parts, can be combined, unpacked, and modified to create the instructions 824. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, compiled or interpreted (e.g., into a library, stand-alone executable etc.) at a local machine, and executed by the local machine.

The instructions 824 can be further transmitted or received over a communications network 826 using a transmission medium via the network interface device 820 utilizing any one of a number of transfer protocols (e.g., frame relay, internet protocol, transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. The specification and drawings are to be regarded in an illustrative sense rather than a restrictive sense.

What is claimed is:

1. A memory sub-system, comprising:
a memory component;
a processing device operably coupled to the memory component; and
a phase change material (PCM) in contact with exactly four sides of the memory component to allow cooling of the memory component.

2. The memory sub-system of claim 1, further comprising:
a heat spreader thermally coupled to the PCM to dissipate heat from the memory component.

3. The memory sub-system of claim 2, wherein the heat spreader is a graphite heat spreader.

4. The memory sub-system of claim 2, wherein the heat spreader is a copper heat spreader.

5. The memory sub-system of claim 2, wherein the heat spreader is also thermally coupled to the processing device to dissipate heat from the processing device.

6. The memory sub-system of claim 5, wherein the heat spreader comprises a thermal isolator that thermally isolates a first portion of the memory sub-system from a second portion of the memory sub-system, the first portion comprising the memory component and the second portion comprising the processing device.

7. The memory sub-system of claim 1, further comprising:
heatsink fins thermally coupled to the memory component, wherein the PCM is indirectly coupled to the memory component via the heatsink fins.

8. The memory sub-system of claim 1, further comprising:
an enclosure, wherein the PCM is thermally coupled to the enclosure.

9. The memory sub-system of claim 1, wherein the PCM increases a time the memory sub-system is able to be used before thermal throttling begins.

10. The memory sub-system of claim 1, further comprising a power management integrated circuit (PMIC).

11. A method of manufacturing a memory sub-system comprising:
adding a memory component to a printed circuit board (PCB);
adding a processing device coupled to the memory component to the PCB; and
applying a phase change material (PCM) to the PCB, such that the PCM is in contact with exactly four sides of the memory component to allow cooling of the memory component.

12. The method of claim 11, wherein the PCM is cut to match a shape of the memory component.

13. The method of claim 11, further comprising:
applying a heat spreader to the memory sub-system, such that the heat spreader is thermally coupled to the PCM to dissipate heat from the memory component.

14. The method of claim 13, wherein the heat spreader is a graphite heat spreader.

15. The method of claim 13, wherein the heat spreader is a copper heat spreader.

16. The method of claim 13, wherein the heat spreader is also thermally coupled to the processing device to dissipate heat from the processing device.

17. The method of claim 16, wherein the heat spreader comprises a thermal isolator that thermally isolates a first portion of the memory sub-system from a second portion of the memory sub-system, the first portion comprising the memory component and the second portion comprising the processing device.

18. The method of claim 11, further comprising:
thermally coupling heatsink fins to the memory component, wherein the PCM is indirectly coupled to the memory component via the heatsink fins.

19. The method of claim 11 further comprising:
enclosing the PCB in an enclosure, wherein the PCM is thermally coupled to the enclosure.

20. The method of claim 11, further comprising adding a power management integrated circuit (PMIC) to the PCB.

* * * * *